(12) United States Patent
Ying Yin Ho

(10) Patent No.: US 7,652,441 B2
(45) Date of Patent: Jan. 26, 2010

(54) METHOD AND SYSTEM FOR STARTING A SENSORLESS MOTOR

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 529 days.

(21) Appl. No.: 11/477,185

(22) Filed: Jun. 28, 2006

(65) Prior Publication Data

US 2007/0001635 A1 Jan. 4, 2007

Related U.S. Application Data

(60) Provisional application No. 60/696,194, filed on Jul. 1, 2005, provisional application No. 60/717,103, filed on Sep. 14, 2005.

(51) Int. Cl.
*H02P 6/22* (2006.01)
*H02P 1/00* (2006.01)

(52) U.S. Cl. .................. 318/400.32; 318/400.33; 318/799; 318/431; 318/101; 361/23

(58) Field of Classification Search ......... 318/798–815, 318/431, 54, 65, 86, 101, 102, 103, 400.32, 318/400.33, 400.35; 361/23
See application file for complete search history.

(56) References Cited

U.S. PATENT DOCUMENTS

| | | | | |
|---|---|---|---|---|
| 4,678,973 A | * | 7/1987 | Elliott et al. | 318/400.11 |
| 5,001,405 A | * | 3/1991 | Cassat | 318/400.33 |
| 5,744,921 A | * | 4/1998 | Makaran | 318/400.34 |
| 5,982,119 A | * | 11/1999 | Okada et al. | 318/286 |
| 6,555,981 B1 | * | 4/2003 | Sun | 318/459 |
| 6,555,988 B2 | * | 4/2003 | Masaki et al. | 318/721 |
| 7,202,623 B2 | * | 4/2007 | Zhou et al. | 318/400.11 |
| 2004/0155613 A1 | * | 8/2004 | Sugiyama et al. | 318/254 |
| 2005/0189892 A1 | * | 9/2005 | Kokami et al. | 318/254 |
| 2006/0044664 A1 | * | 3/2006 | Itagaki et al. | 360/73.03 |
| 2006/0082336 A1 | * | 4/2006 | Kurosawa et al. | 318/254 |

(Continued)

FOREIGN PATENT DOCUMENTS

DE 197 47 412 4/1999

(Continued)

OTHER PUBLICATIONS

German Office Action issued Sep. 12, 2007 in corresponding German Patent Application No. 102006030362.8.

*Primary Examiner*—Walter Benson
*Assistant Examiner*—Eduardo Colon-Santana
(74) *Attorney, Agent, or Firm*—Farjami & Farjami LLP

(57) ABSTRACT

A motor drive system for a sensorless motor includes a catch start sequencer that controls the motor drive system to robustly start the motor in the event the motor rotor is rotating in forward or reverse direction prior to activating the motor drive system. In particular, the catch start sequencer causes the motor drive system to initially find and track the rotor position, and then determines the speed and possibly the direction of rotation of the rotor. If the rotor is rotating in the reverse direction, the catch start sequencer controls the motor drive system to slow the speed of rotation and to then start the rotor rotating in the forward direction.

25 Claims, 8 Drawing Sheets

U.S. PATENT DOCUMENTS

| | | | |
|---|---|---|---|
| 2006/0193090 A1* | 8/2006 | Ho | 361/23 |
| 2008/0048599 A1* | 2/2008 | Ho | 318/400.33 |
| 2009/0026991 A1* | 1/2009 | Boscolo Berto | 318/400.35 |

FOREIGN PATENT DOCUMENTS

| | | |
|---|---|---|
| DE | 10 2004 003 153 | 8/2004 |
| DE | 697 27 477 | 11/2004 |
| DE | 10 2006 030 362 | 1/2007 |
| JP | 2003235287 A * | 8/2003 |

* cited by examiner

MOTOR U-PHASE CURRENT

ESTIMATED ROTOR ANGLE

METHOD AND SYSTEM FOR STARTING A SENSORLESS MOTOR

RELATED APPLICATIONS

This application is based on and claims priority to U.S. Provisional Application No. 60/696,194, filed on Jul. 1, 2005, by Eddy Ying Yin Ho, entitled, "REVERSE CATCH SPIN CONTROL FOR FAN MOTORS," and is based on and claims priority to U.S. Provisional Application No. 60/717,103, filed on Sep. 14, 2005, by Eddy Ying Yin Ho, entitled, "CATCH START OF PERMANENT MAGNET MOTORS WITHOUT VOLTAGE OR SHAFT POSITION SENSORS," the contents of which applications are herein incorporated by reference.

BACKGROUND OF THE INVENTION

1. Field of the Invention

This invention relates to a motor drive system and more specifically, relates to a motor drive system for starting a sensorless motor where the motor rotor may be rotating prior to activation of the motor drive system.

2. Description of the Art

Many motor drive systems and motors, such as permanent magnet synchronous motors (PMSM), use sensorless control techniques to reduce cost and to increase reliability. These motor drive systems and motors are sensorless in that they do not include functionality to measure the voltage feedback from the motor and/or sensors to detect the position of the motor rotor. Rather, rotor position is determined based on estimates of the motor winding currents.

Notably, due to an external load, the rotor of a motor may be rotating (forward or reverse) prior to activation of the motor drive inverter. For example, if a sensorless motor drive system and motor are for an outdoor fan (such as for an air conditioning unit), the wind may force the fan and thereby the motor rotor to rotate prior to activation of the inverter. As is known, once the rotor is spinning, the motor generates a back EMF. Because the motor drive system and motor are sensorless, however, the phase and magnitude of this back EMF are unknown to the motor drive system when activating the inverter. As a result, when the inverter is activated, the inverter output voltage will typically be out of phase and magnitude with the motor back EMF. Problematically, if the motor is spinning at high enough rate and thereby generating a large back EMF, this mismatch can result in a large motor current, thereby causing over current shutdown of the inverter.

An additional problem also occurs when the rotor has reverse rotation prior to activating the inverter. Under these conditions, the sensorless (i.e., no voltage or Hall sensors, only current sensors) motor drive system must control the motor speed to go from the reverse direction to the forward direction, which may be difficult when the inverter has no regeneration capability and the rotor is spinning at a high rate.

Accordingly, it would be desirable to provide a motor drive system that uses sensorless control techniques and that is able to robustly start a motor when the motor rotor may be rotating in a forward or reverse direction prior to activation of the motor drive inverter.

BRIEF SUMMARY OF THE INVENTION

According to an embodiment of the invention, a motor drive system for driving a sensorless motor includes a controller and an inverter, the controller including a catch start sequencer for controlling the motor drive system to robustly start the motor in the event the motor rotor is initially rotating due to an external torquing force. Specifically, according to an embodiment of the invention, upon initial energizing of the inverter, the catch start sequencer assumes that the motor rotor may be already rotating and causes the motor drive system to track the rotor position and to enforce zero current regulation, resulting in the phase and magnitude of the inverter output voltage matching the phase and magnitude of the motor back EMF. As a result, a large motor current is prevented at the initial start of the inverter, thereby preventing over current shutdown of the inverter.

Thereafter, the catch start sequencer estimates the rotor speed. According to an embodiment of the invention, this estimation is based on the amplitude of the rotor flux. Assuming near zero rotor speed is determined for example (i.e., the rotor is either not rotating or rotating at a slow speed in either the forward or reverse direction), the catch start sequencer causes the inverter to force/impress a forward rotating current vector on the motor to ensure the rotor is rotating in the forward direction and once the rotor attains a threshold speed, completes operation by configuring the motor drive system to bring the speed of the motor up to a set point and to thereafter assume normal operation.

On the contrary, if the catch start sequencer determines that the rotor is rotating at an appreciable speed, the catch start sequencer next determines the direction of rotation of the rotor. Assuming the catch start sequencer determines forward rotor rotation, the catch start sequencer thereafter completes operation by configuring the motor drive system to bring the speed of the motor up to a set point and to assume normal operation.

Assuming, however, that the catch start sequencer detects reverse rotor rotation, the catch start sequencer next proceeds to slow down and possibly stop the reverse rotation of the rotor. Specifically, according to an embodiment of the invention, the catch start sequencer causes the inverter to apply a zero voltage vector to the motor, the zero voltage vector shorting the motor phase windings and thereby having the effect of slowing down the rotational spin of the rotor and possibly stopping the rotor.

Thereafter and according to an embodiment of the invention, the catch start sequencer causes the motor drive system to switch from the zero voltage vector mode to an open-loop mode and causes the inverter to force/impress a forward rotating current vector on the motor with the intent of causing the rotor to slowly stop (assuming the rotor is still spinning in the reverse direction) and to then start spinning in the forward direction. Notably, the rotation of the rotor and the forward rotating current vector will initially oppose each other due to the external torquing force on the rotor. As such and according to an embodiment of the invention, the catch start sequencer causes the forward rotating current vector to be applied such that the initial position of the vector is aligned with or behind the position of the rotor magnet. This positioning is beneficial in that it causes the forward rotating current vector to produce a torque on the rotor that is always opposed to the external torquing force. According to an embodiment of the invention, the position of the rotor magnet (so as to obtain an initial position for the forward rotating current vector) is determined based on a phasing of the motor current while the inverter is applying a zero voltage vector to the motor, as described above.

According to an embodiment of the invention, once the forward rotating current vector is applied to the motor, the motor torque will increase as the rotor angle departs from the rotating current vector. The developed torque will eventually overcome the external reverse torquing force, causing the rotor to stop, reverse direction, and then spin in the forward direction in synchronization with the current vector. The rotor speed will then increase as the current vector speeds up.

According to an embodiment of the invention, the catch start sequencer continues to apply the open loop forward rotating current vector until the rotor's forward speed exceeds a threshold. Thereafter, the catch start sequencer causes the motor drive system to switch to closed loop control and completes operation by configuring the motor drive system to bring the speed of the motor up to a set point and to assume normal operation.

Other features and advantages of the present invention will become apparent from the following description of the invention, which refers to the accompanying drawings.

DETAIL DESCRIPTION OF THE INVENTION

Figure 1:
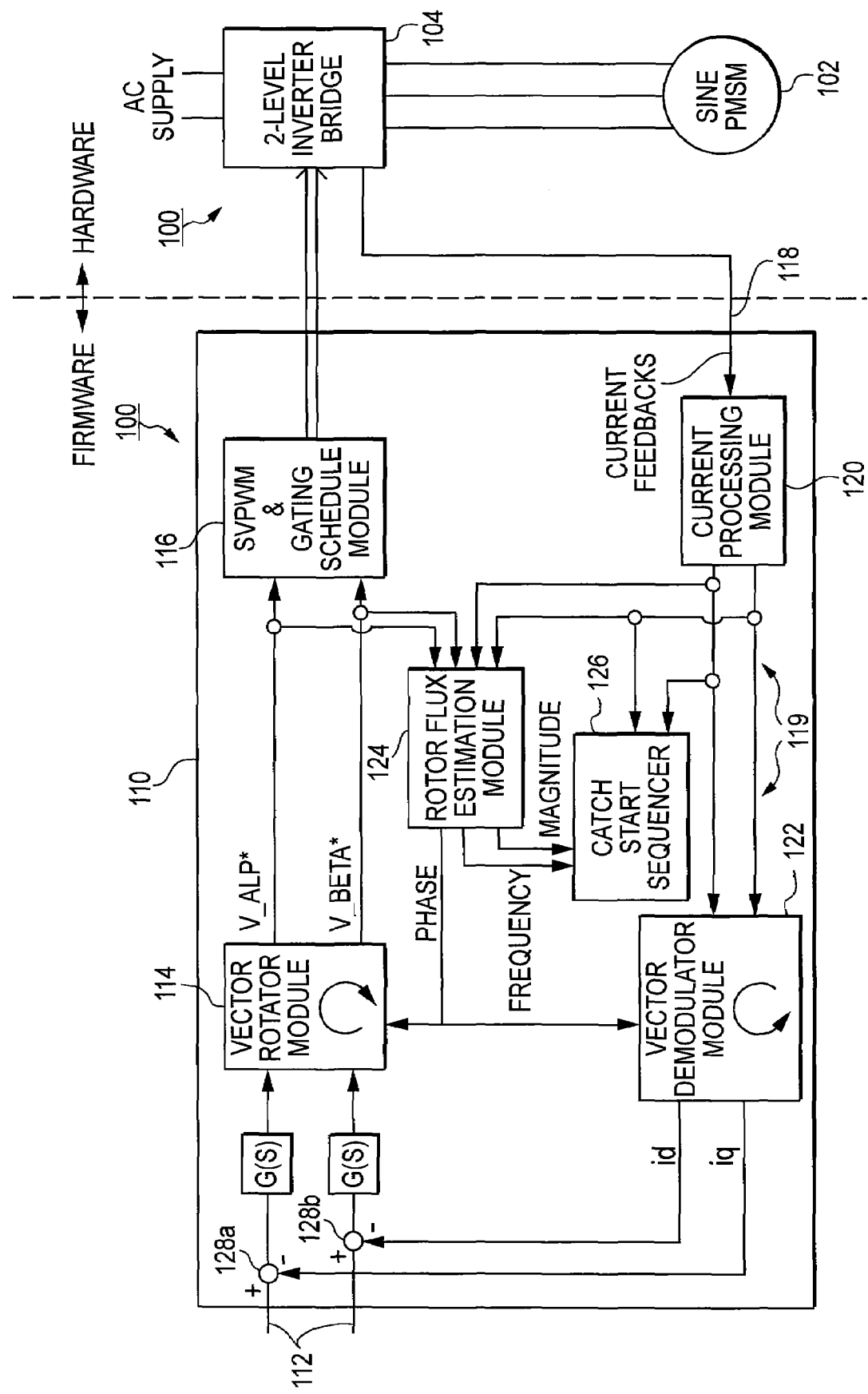
FIG. 1 shows a functional diagram of a motor drive system according to an embodiment of the invention, the motor drive system including a catch start sequencer for controlling the motor drive system to start a motor having a rotor that may be initially rotating prior to activation of the motor drive system.

Referring to FIG. 1, there is shown a functional diagram of a motor drive system 100 according to an embodiment of the invention for driving a sensorless motor 102, such as a three-phase permanent magnet synchronous motor (PMSM). Motor drive system 100 includes an inverter 104, such as a three-phase inverter, that generates power signals that drive motor 102, and includes a controller 110 for configuring the switches of inverter 104 in order to generate the motor power signals. Controller 110 includes control inputs 112 for receiving motor speed commands, a vector rotator module 114, a pulse width modulation module 116, a rotor flux estimation module 124, and a d-q current regulator 119 configured as a current feedback loop between inverter 104 and control inputs 112. As shown, d-q current regulator 119 includes feedback lines 118 interfaced to inverter 104 and for obtaining representations of the three motor phase currents of motor 102, a current processing module 120 interfaced to the feedback lines 118 and for converting the three motor phase currents into equivalent two-phase values, and a vector demodulator module 122 interfaced to the current processing module and for decoupling the equivalent two-phase values into two DC current components $i_q$ (representing torque) and $i_d$ (representing flux). As also shown, based on the output of vector rotator module 114 and the output of current processing module 120, rotor flux estimation module 124 estimates the rotor flux of motor 102 and thereafter estimates, using a phase lock loop (PLL) for example, values for the rotor phase angle and rotor speed/frequency, providing the rotor phase angle to vector rotator module 114 and vector demodulation module 122.

According to an embodiment of the invention, vector rotator module 114, pulse width modulation module 116, rotor flux estimation module 124, current processing module 120, and vector demodulator module 122 may be implemented as firmware. Nonetheless, one skilled in the art will recognize that one or more of these modules may be implemented in other ways, including as hardware and/or as software executed on a DSP (digital signal processor), for example. One skilled in the art will also recognize that the functionality of each module may be implemented as several modules, each implemented as firmware, hardware, and/or software.

In general, vector rotator module 114, pulse width modulation module 116, rotor flux estimation module 124, d-q current regulator 119, and inverter 104 operate as a standard sensorless motor drive system for driving motor 102. In particular, based on the rotor angle information from rotor flux estimation module 124, the desired rotor speed information at control inputs 112, and the current feedback from d-q current regulator 119, vector rotator module 114 produces two command voltages V_Alp and V_Beta (sine waveforms) that are forwarded to pulse width modulation module 116. Pulse width modulation module 116 is interfaced at its output to each of the gates of the switches of inverter 104. Based on command voltages V_Alp and V_Beta, pulse width modulation module 116 generates pulse width modulated command signals that appropriately schedule the turning on/off of the inverter switch gates to configure inverter 104 to drive motor 102 to the desired speed as specified at control inputs 112.

As further shown in FIG. 1 and according to an embodiment of the invention, controller 110 also includes a catch start sequencer 126. Similar to the other modules of controller 110, this module may also be implemented as firmware, or alternatively, may be implemented as hardware or software. One skilled in the art will also recognize that the functionality of catch start sequencer 126 may be implemented as several modules, each implemented as firmware, hardware, and/or software.

According to an embodiment of the invention, based on current values from current processing module 120 and rotor speed and rotor flux magnitude/amplitude estimates from rotor flux estimation module 124, catch start sequencer 126 controls the initial starting of motor 102. Specifically, according to an embodiment of the invention when inverter 104 is initially energized to power motor 102, catch start sequencer 126 configures motor drive system 100 so as to robustly start the motor in the event the motor rotor is already spinning, such as when an external load like the wind is forcing the rotor to spin. In particular and as further described below, catch start sequencer causes controller 110/inverter 104 to initially find and track the rotor position, and then based on the rotor's speed and direction of rotation, configures controller 110/inverter 104 to ensure robust startup of motor 102.

Figure 2:
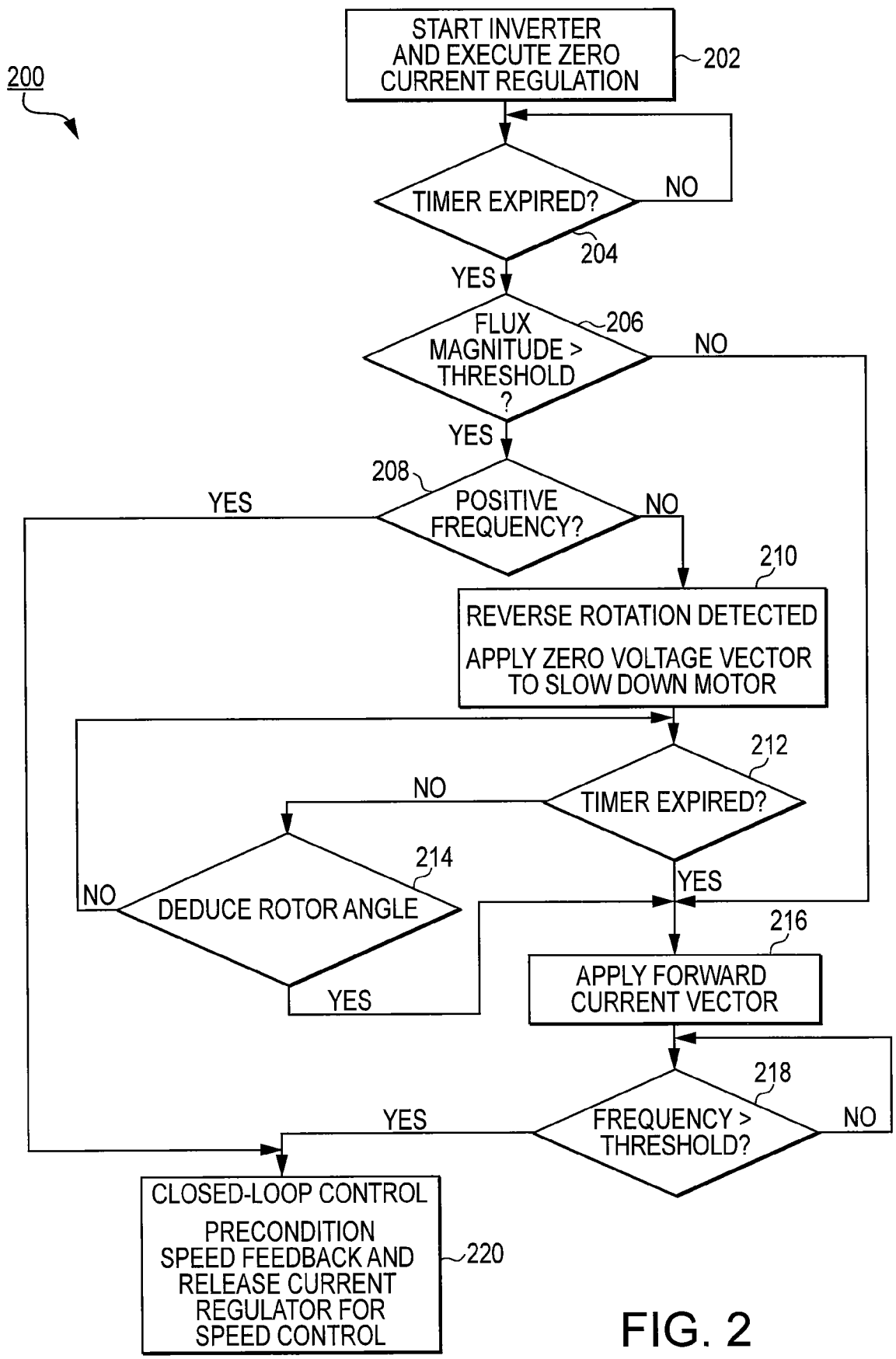
FIG. 2 shows a process according to an embodiment of the invention performed by the catch start sequencer of FIG. 1 to initially start a motor.

Specifically, referring to FIG. 2, there is shown a process according to an embodiment of the invention executed by catch start sequencer 126 to initially start motor 102. Beginning with step 202, as inverter 104 is initially energized, catch start sequencer 126 assumes that the motor rotor may already be spinning and configures controller 110 so as to prevent over current shutdown of the inverter. Specifically, catch start sequencer 126 initially configures control inputs 112 such that the motor current is forced to zero by zero current regulation. Notably, due to zero current regulation and by tracking the phase angle of the rotor as estimated by the rotor flux estimation module 124, vector rotator module 114 quickly generates command voltages V_Alp and V_Beta that match the motor back EMF. As a result, the phase and magnitude of the inverter output voltage is forced to match the phase and magnitude of the motor back EMF, thereby preventing a large motor current at the initial start of the inverter and thereby preventing over current shutdown of the inverter.

As shown by step 204, zero current regulation is continued for a fixed duration, which may be configurable, before proceeding to step 206. In particular, it may take less than about 50 msec for the inverter output voltage to match the motor back EMF. To ensure the inverter and motor reach this state, however, the duration of the zero current regulation may be set to about 200 msec, for example.

Proceeding to step 206, the catch start sequencer 126 next determines whether the motor rotor is rotating and if so, a relative measure as to the speed of this rotation. In general, methods for computing the rotor's speed are not robust when the motor back EMF is small (e.g., <1%), or in other words, when the motor is spinning at a slow rate. As such, according to an embodiment of the invention, catch start sequencer 126 uses the amplitude of the rotor flux as a way to estimate the rotor's speed.

Figure 3:
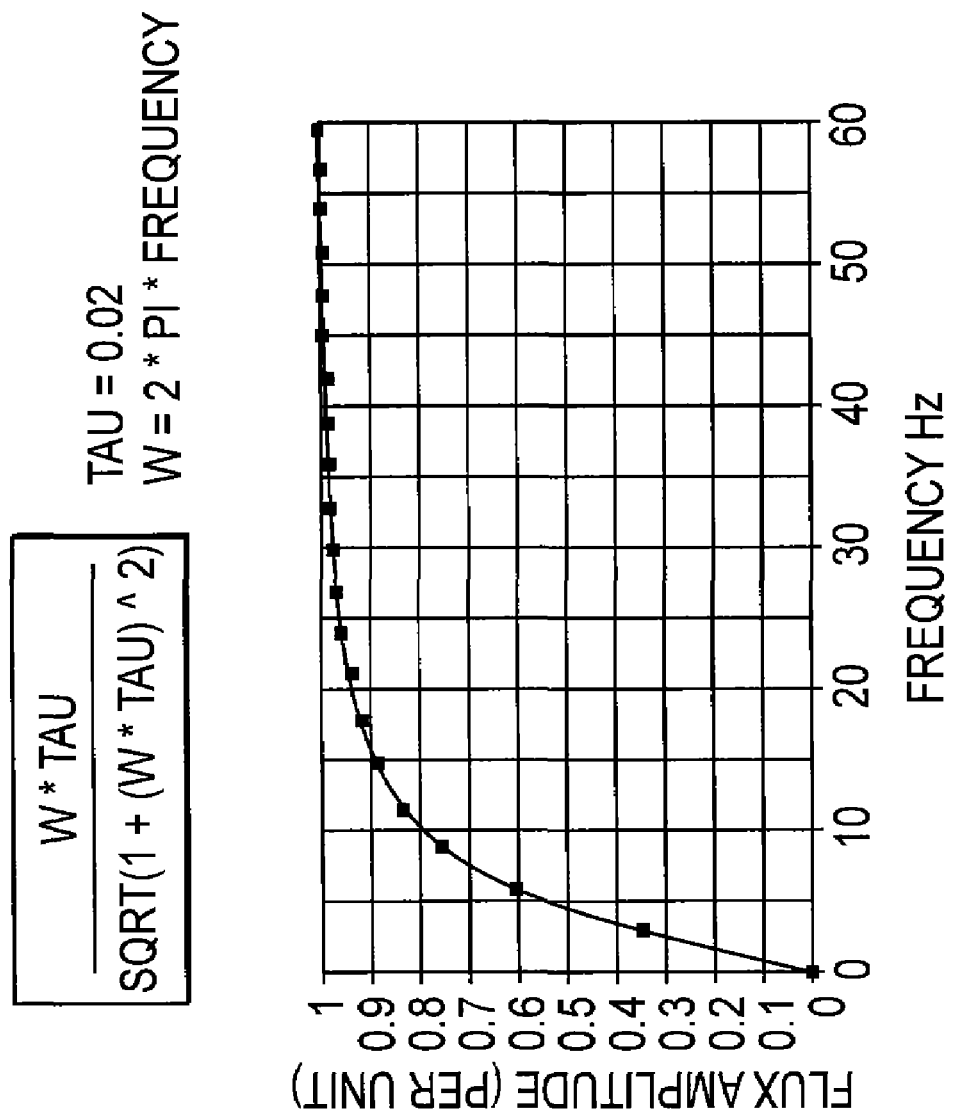
FIG. 3 shows an example graphical relationship between rotor flux amplitude and rotor speed, according to an embodiment of the invention.

Specifically, according to an embodiment of the invention rotor flux estimation module 124 includes one or more non-ideal integrators for calculating the amplitude (Volts/Hz) of the rotor flux. Notably, the flux amplitude as calculated by these integrators can be used to indirectly estimate/extract information about the speed of the rotor. For example, referring to FIG. 3 there is shown a graph of flux amplitude as calculated from a non-ideal integrator versus rotor speed/frequency. Note that the equation in FIG. 3 gives the amplitude of the flux as a function of frequency. As shown by the graph, the flux amplitude is deterministic and constant when the rotor speed is high and starts to gradually reduce (corner frequency cutoff point of non-ideal integrator) as the rotor speed decreases. Accordingly, by observing the amplitude of the rotor flux after performing zero current regulation, a relative measure of the rotor speed can be approximated.

Specifically and according to an embodiment of the invention, in step 206 catch start sequencer 126 receives as input from rotor flux estimation module 124 the amplitude of the rotor flux and compares this flux amplitude to a threshold, which may be configurable. If the rotor flux amplitude is below the threshold, catch start sequencer 126 concludes that the rotor has near zero speed (i.e., the rotor is either not rotating or rotating at a slow speed in either the forward or reverse direction). In this case, the catch start sequencer configures controller 110 to stop zero current regulation and proceeds to step 216, configuring the controller and inverter to perform normal zero speed startup, as described below. However, if catch start sequencer 126 determines that the rotor speed is above the threshold (e.g., >1%), the catch start sequencer concludes that the rotor is rotating at an appreciable speed and as a result, performs a catch start sequence. As described below, the catch start sequence is different depending on whether the rotor is rotating in the forward direction (positive frequency of rotation) or in the reverse direction (negative frequency of rotation).

Accordingly, proceeding to step 208, the catch start sequencer 126 next determines the direction of rotation of motor 102. Specifically, as indicated above, the rotor flux estimation module 124 is able to determine the frequency/speed of the rotor. This frequency/speed is provided to the catch start sequencer 126, which makes a determination of the rotor direction based on the whether the frequency is positive or negative. Assuming positive/forward rotation is detected, current regulator 119 is in a state of tracking and as such, motor drive system 100 is ready to generate motoring torque. Accordingly, catch start sequencer 126 configures controller 110 to stop zero current regulation and proceeds to step 220. Here, catch start sequencer 126 completes operation by starting a speed regulator, which takes over and generates the appropriate speed/current commands at inputs 112 for speed regulation. As a result, motor drive system 100 continues operation as normal, running without interruption and bringing the speed of motor 102 up to the set point.

Assuming, however, that catch start sequencer 126 detects negative/reverse rotor rotation at step 208, the catch start sequencer next proceeds to step 210 and slows down and possibly stops the reverse rotor rotation. Specifically and according to an embodiment of the invention, at step 210 catch start sequencer 126 causes inverter 104 to apply a zero voltage vector (i.e., a zero inverter output voltage) to the motor by causing each of the bottom/low-side switches in each of the power stages of inverter 104 to turn on. The zero voltage vector has the effect of slowing down the rotational spin of the rotor because the motor terminals (i.e., phase windings) are short-circuited by the inverter. As a result, the rotor slows down to a lower speed. Notably, if no or insufficient external torque is forcing the rotor to spin in the reverse direction, the rotor speed will go to zero (i.e., the rotor will stop). However, if there is a sufficient external reverse torque, the rotor will continue to rotate in the reverse direction, now at a lower speed. One skilled in the art will recognize that the same result may also be obtained by causing each of the top/high-side switches in each of the power stages of inverter 104 to turn on.

As shown by step 212, the zero voltage vector mode is continued for a fixed duration, which may be configurable, in order to allow sufficient time to slow/brake the motor. Thereafter and according to an embodiment of the invention, catch start sequencer 126 proceeds to step 216 and causes motor drive system 100 to switch from the zero voltage vector mode to an open-loop mode where the current is fully controlled and the angle is forced to advance by a prescribed profile determined by the torque current feedback (Angle=integral of speed, Speed to integral of torque current multiplied by a gain) and configures controller 110 such that inverter 104 forces/impresses a forward rotating current vector on the motor. This open-loop forward rotating current vector is intended to cause the rotor to slowly stop, assuming the rotor is still rotating in the reverse direction, and to then start rotating in the forward direction.

Figure 4B:
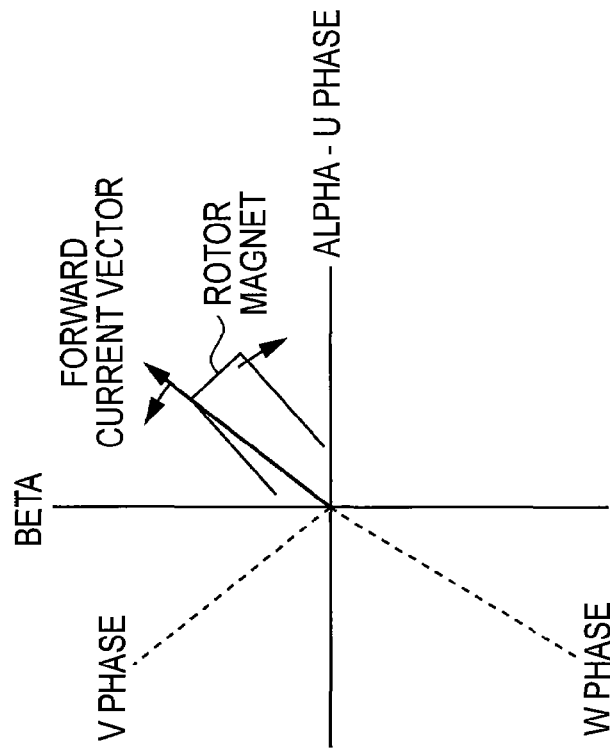
FIGS. 4A and 4B show desired initial positions according to an embodiment of the invention for applying a forward rotating current vector to a motor having a rotor rotating in a reverse direction, the forward rotating current vector being used to reverse the direction of rotation of the rotor.
Figure 4A:
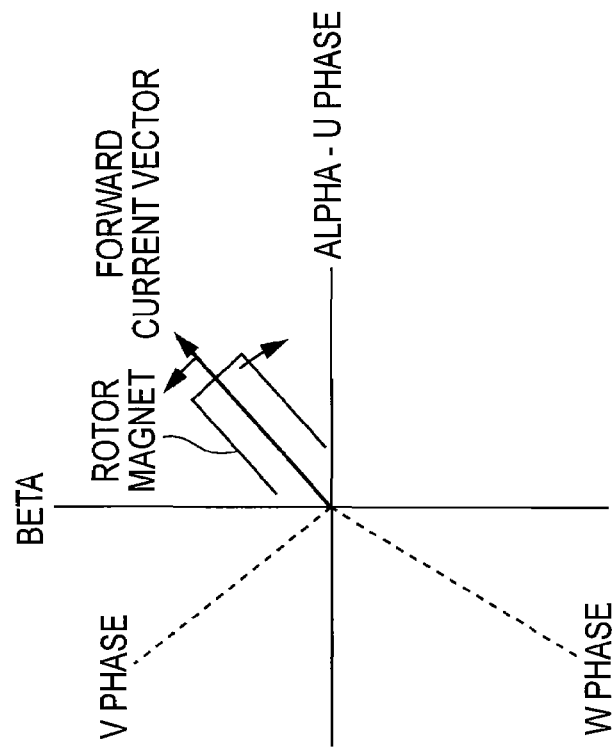
Figure 4C:
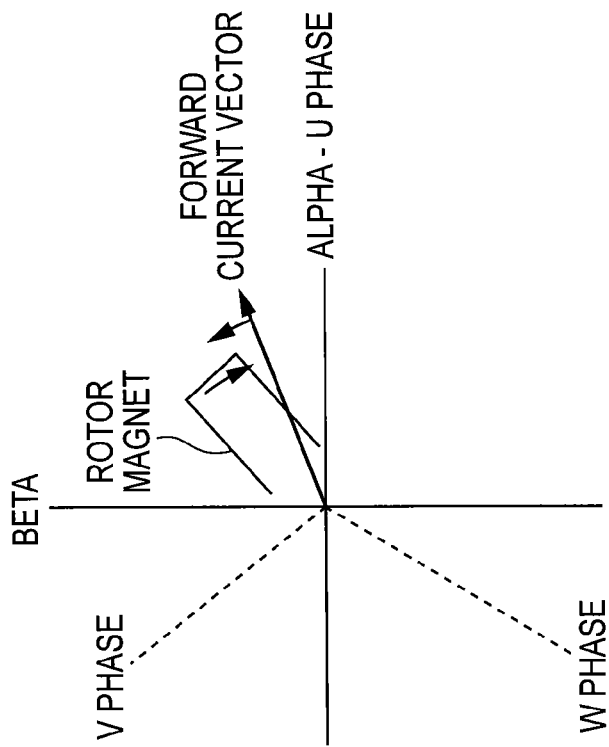
FIG. 4C shows an undesired initial position of the forward rotating current vector of FIGS. 4A and 4B.

Notably, as the forward rotating current vector is applied, the reverse rotation of the rotor and the vector will initially oppose each other due to the external load torque. As such and according to an embodiment of the invention, the initial position of the forward rotating current vector is selected so as to be aligned with or behind the position of the rotor magnet. Notably, this positioning is beneficial in that it causes the forward rotating current vector to produce a torque on the rotor that is always opposed to the external torquing force, thereby causing the rotor to slow down. For example, FIG. 4A shows an initial phase angle for the forward rotating current vector that is aligned with the phase angle of the rotor magnet. With this initial phasing, the generated motor torque will always start from zero and will oppose the external load torque that forces the rotor to spin in the reverse direction. Similarly, FIG. 4B shows an initial phase angle for the forward rotating current vector that positions the vector behind the rotor magnet. Again, this initial phasing will also produce an opposing torque. On the contrary, referring to FIG. 4C, there is shown an initial phase angle for the forward rotating current vector in which the vector is initially placed ahead of the rotor magnet. Notably, this phasing will cause the rotor to speed up in the reverse direction and is therefore undesirable. Accordingly, it is desirable to determine the rotor magnet position (i.e., phase angle) prior to applying the forward rotating current vector so that the vector may be initially placed in alignment with or behind the rotor magnet.

Figure 5:
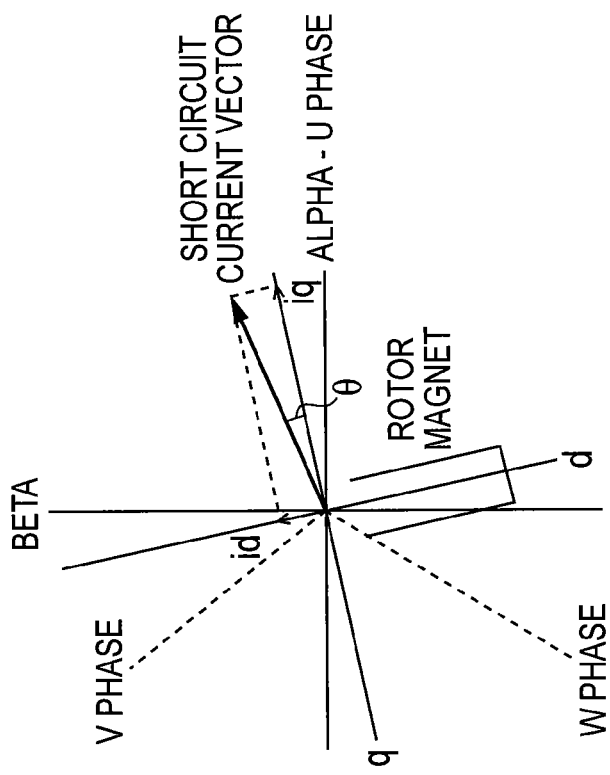
FIG. 5 shows a positional relationship according to an embodiment of the invention between a motor rotor and a current vector of the motor when the motor phase windings are short-circuited, the positional relationship being a function of a phase angle shift, $\theta$.
Figure 6B:
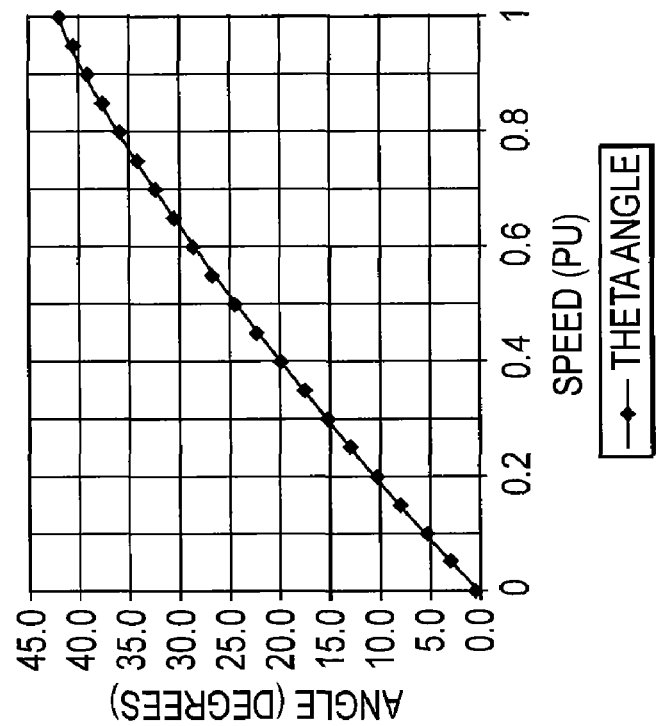
FIG. 6B shows an example graphical relationship according to an embodiment of the invention between the phase angle shift of FIG. 5 and rotor speed.
Figure 6A:
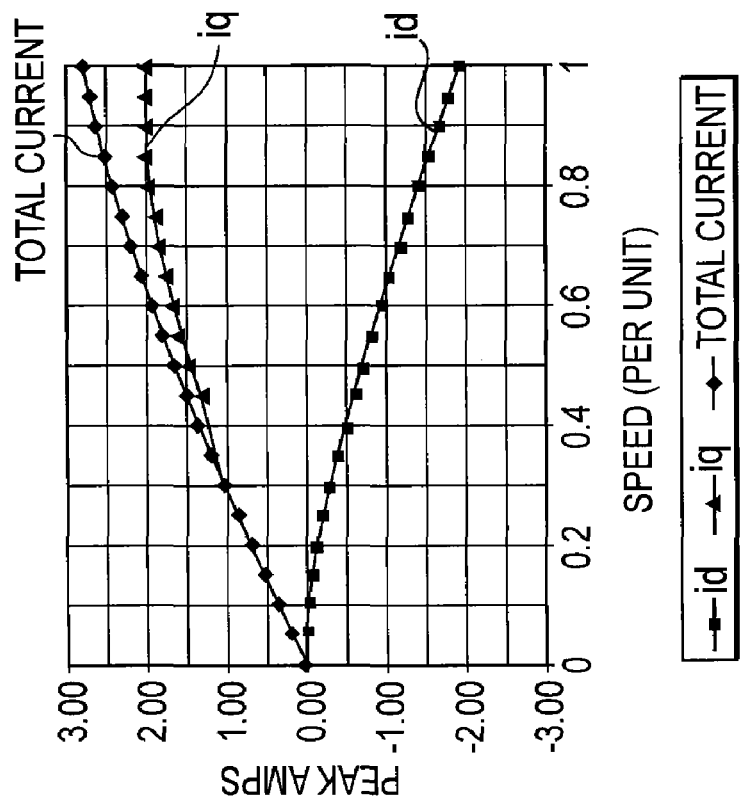
FIG. 6A shows an example graphical relationship according to an embodiment of the invention between the short-circuit current vector of FIG. 5 and rotor speed.

Notably, if the rotor is rotating at low speed, it may be difficult to determine the rotor magnet phase angle due to small back EMF. As such and according to an embodiment of the invention, catch start sequencer 126 at step 214 monitors the short circuit motor current generated by the zero voltage vector mode and based on the motor current phasing, deduces the rotor magnet phase angle. Specifically, referring to FIG. 5, there is shown a relationship between the rotor magnet angle/position and the short circuit motor current vector that results from the zero voltage vector mode. As shown in FIG. 5, the rotor angle is displaced from the short circuit current vector by 90° plus a phase angle shift (i.e., the angle θ). It may be noticed that at low rotor speeds (e.g., <4%), the q-axis current ($i_q$) dominates the total current such that the rotor angle approaches 90° from the short circuit current vector. Similarly, as the rotor speed increases, the d-axis current ($i_d$) begins to increase, causing θ to increase. In general, FIGS. 6A and 6B show the relationship between the short circuit current vector (id and $i_q$) and the rotor speed, with FIG. 6A showing the change in the short circuit current vector with increased rotor speed and FIG. 6B showing an increase in θ with increased rotor speed.

As can be seen, by determining the phasing of the short circuit current vector and then determining a value for θ the catch start sequencer 126 may deduce the rotor magnet phase angle. Specifically, according to an embodiment of the invention, at step 214 the catch start sequencer first determines/measures the phasing of the short circuit current vector as the vector passes through the Beta or Alpha axis, for example, which are a stationary reference frame with Alpha aligned with the "U" phase motor winding. Thereafter, the catch start sequencer determines a value for θ and estimates the rotor angle as a function of the short circuit current vector phasing and θ. In general, catch start sequencer 126 may determine θ in several ways. In particular, according to an embodiment of the invention, the relationship between θ and rotor speed (as shown in FIG. 6) may be measured offline and stored as a table in a processing unit/memory of controller 110. Assuming the catch start sequencer 126 has the speed of the rotor, the module may access the table to determine θ. According to another embodiment of the invention, catch start sequencer 126 may compute the vector components $i_d$ and $i_q$ from the measured short circuit current vector and then compute θ from $i_d$ and $i_q$. As an example, $i_d$ and $i_q$ may be estimated as shown by equation (1), $$iq = -We*FlxM/(R+We*We*Ld*Lq/R)$$

$$id = We*Lq*iq/R \quad (1)$$

where We is frequency, Flxm is magnet flux linkage, Ld and Lq are the motor d-q inductances, and R is the stator resistance of the motor.

Notably, in many cases the zero voltage vector mode will significantly slow down the rotor speed. As such, according to another embodiment of the invention, rather than catch start sequencer 126 calculating θ, it may estimate θ as a small constant phase angle shift, which may be configurable. In general, a small constant phase angle shift will achieve near optimal phasing as shown in FIGS. 4A and 4B and avoid the undesirable condition shown in FIG. 4C.

Referring again to FIG. 2, once catch start sequencer 126 determines the rotor magnet angle as described above, the module proceeds to step 216 where, as indicated above, the module causes motor drive system 100 to switch from the zero voltage vector mode to an open-loop mode and configures controller 110 such that inverter 104 forces/impresses a forward rotating current vector. Again, the switching instance from the zero voltage vector mode to applying the open-loop forward rotating current vector is based on the deduced rotor angle so that the initial position of the forward rotating current vector is either aligned with or behind the rotor.

Once the forward rotating current vector is applied, the motor torque will increase from zero (assuming the vector is initially aligned with the rotor) as the rotor angle departs from the forward rotating current vector. The developed torque will eventually overcome the external reverse torque if sufficient motor current magnitude is applied. Thereafter, the rotor will stop, reverse direction, and then spin forward in synchronization with the current vector. The rotor speed will then increase as the current vector speeds up.

As shown by step 218, the open loop forward rotating current vector is applied until the rotor's forward frequency/speed exceeds a threshold (i.e., an initial speed), which may be configurable, such as 10% of the motor's rated speed. Thereafter, the catch start sequencer proceeds to step 220, where the module causes motor drive system 100 to switch to closed loop control for optimal torque per ampere operation. In particular, catch start sequencer 126 completes operation by starting a speed regulator, which takes over and generates the appropriate speed/current commands at inputs 112 for speed regulation, thereby causing a closed-loop forward rotating current vector to be applied to the motor. As a result, motor drive system 100 continues operation as normal, running without interruption and bringing the speed of motor 102 up to the set point.

It should be noted that as described above at step 206, if the catch start sequencer determines the rotor is either not spinning or spinning at a slow reverse or forward rate, the catch start sequencer proceeds directly to step 216. In this scenario, the catch start sequencer configures motor drive system 100 to an open-loop mode and causes inverter 104 to force/impress a forward rotating current vector, as described above. Here, however, the initial phasing of the forward rotating current vector with respect to the rotor position is less of a concern given the slow rate of the rotor's rotation. Thereafter, operation proceeds as similarly described above.

Figure 7A:
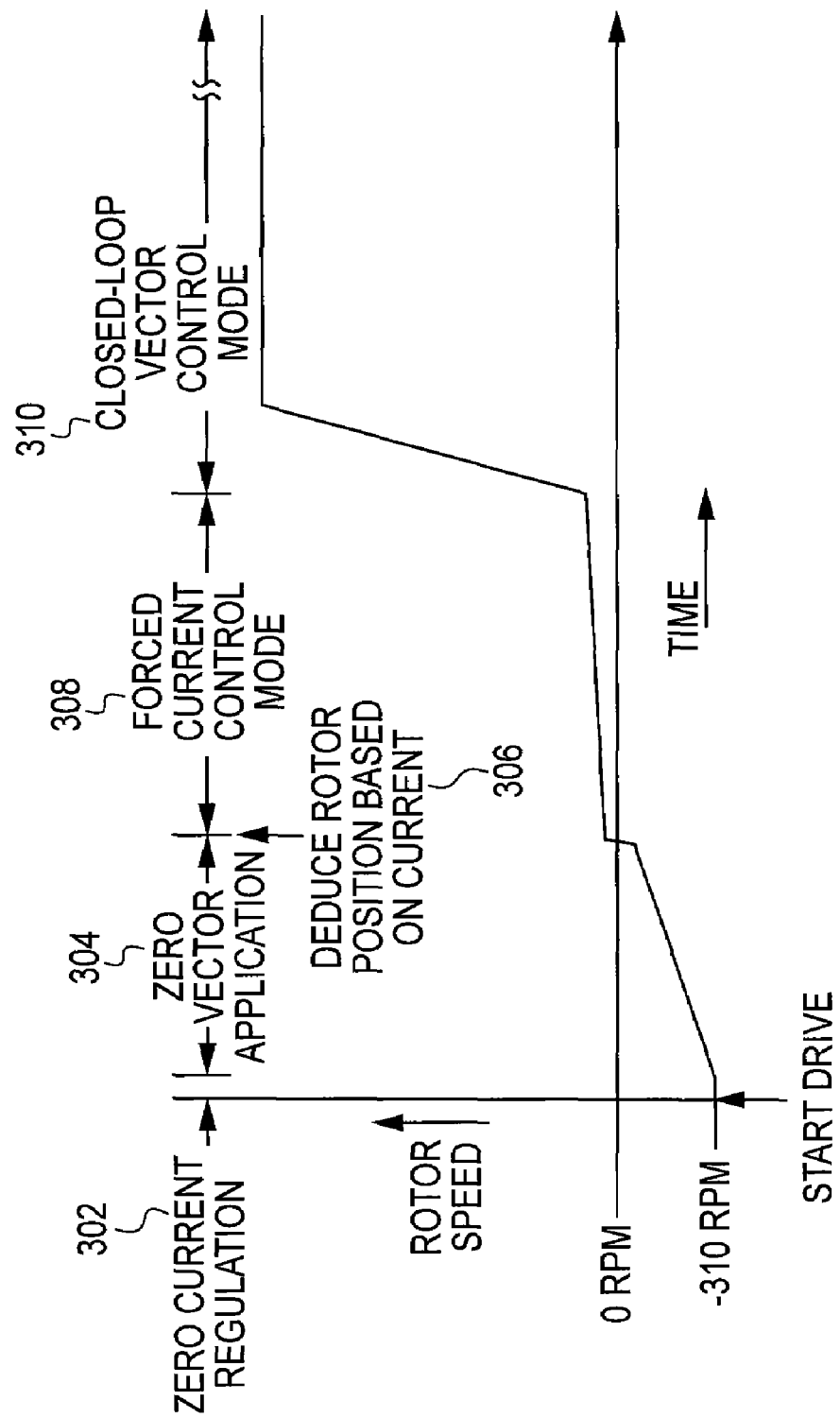
FIG. 7A shows a graphical representation of an example change in rotor speed during different stages of the process of FIG. 2, according to an embodiment of the invention.

Referring now to FIG. 7A, there is shown graphically an example sequence of operation according to an embodiment of the invention for starting a motor that has a rotor initially rotating in a reverse direction as a result of an external torquing force. As shown by stage 302, catch start sequencer 226 initially places motor drive system 100 in zero current regulation mode, thereby causing the phase and magnitude of the inverter output voltage to match the phase and magnitude of the motor back EMF and thereby preventing a large motor current at the initial start of the inverter. Thereafter, upon determining that the rotor is spinning in the reverse direction at an appreciable rate, the catch start sequencer places motor drive system 100 in zero voltage vector mode, thereby causing the rotor's rate of rotation to decrease, a shown by stage 304.

Next, the catch start sequencer determines the position of the rotor (stage 306) and then places motor drive system 100 in open-loop mode, applying a forward current vector that is initially aligned with, for example, the rotor. As shown by stage 308, the forward current vector causes the rotor to stop, reverse direction, and then slowly increase speed in the forward direction. Finally, once the rotor obtains a certain rate of rotation, the catch start sequencer places motor drive system 100 in the closed loop vector control mode, where the rotor is brought up to and maintained at a set point speed, a shown by stage 310.

Figure 7B:
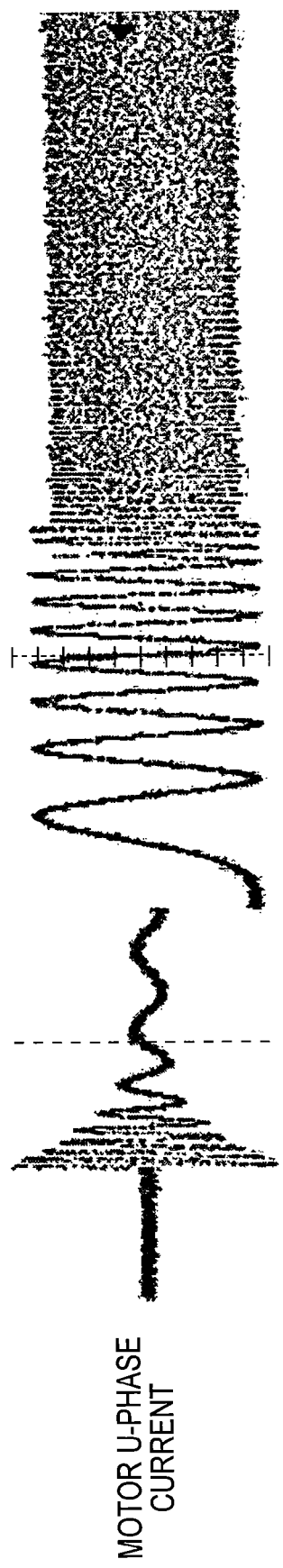
FIG. 7B shows an example change in the motor U-phase current corresponding to each of the stages of FIG. 7A, according to an embodiment of the invention.
Figure 7C:
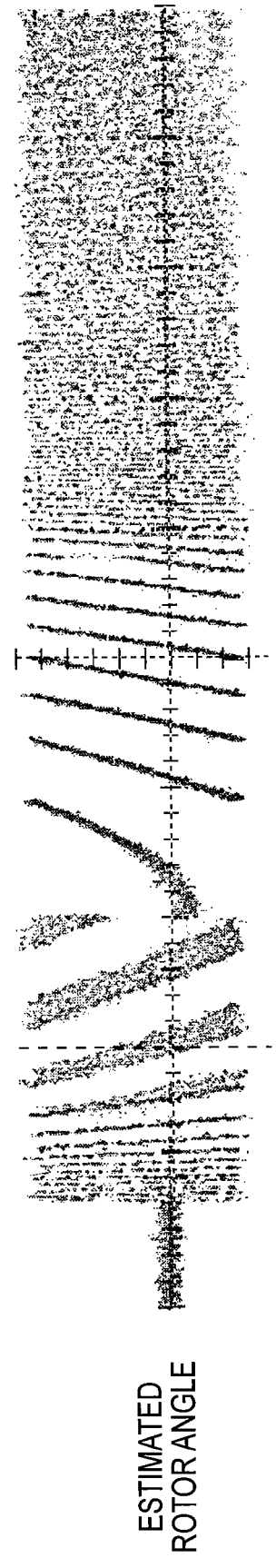
FIG. 7C shows an example change in the estimated rotor angle corresponding to each of the stages of FIG. 7A, according to an embodiment of the invention.

Referring to FIGS. 7B and 7C, there is shown an example change in current in the motor U-phase and an example change in the estimated rotor angle, respectively, each corresponding to the stages of FIG. 7A.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for controlling a motor drive for starting a sensorless motor having a rotor, said method comprising the steps of:
   determining whether the rotor is rotating in a forward or reverse direction; if the rotor is rotating in the reverse direction, causing a short circuiting of phase windings of the motor, thereby slowing down the reverse rotation of the rotor; removing the short circuiting of the motor phase windings, determining an angle of a rotor magnet by determining a phasing of a short-circuit motor current vector, and causing an open-loop forward rotating current vector to be applied to the motor, thereby causing the rotor to spin in the forward direction to an initial speed; and thereafter causing a closed-loop forward rotating current vector to be applied to the motor, thereby causing the rotor to speed up to a set speed.

2. The method of claim 1, further comprising the step of causing the rotor to speed up to the set speed if said determining step determines the rotor is rotating in the forward direction.

3. The method of claim 1, further comprising, prior to said step of determining the direction of rotation of the rotor, the step of estimating a speed of rotation of the rotor.

4. The method of claim 3, wherein said step of estimating the speed of rotation of the rotor includes the steps of: comparing an amplitude of rotor flux to a threshold; and estimating the speed of rotation based on whether the rotor flux amplitude is greater than or less than the threshold.

5. The method of claim 3, wherein if a slow rotor speed is estimated, said method further comprises the steps of: causing the rotor to spin in the forward direction to the initial speed; and thereafter causing the rotor to speed up to the set speed; and wherein if a fast rotor speed is estimated, performing said step of determining the direction of rotation of the rotor.

6. The method of claim 1, further comprising, prior to said step of determining the direction of rotation of the rotor, the step of causing a motor current to be forced to zero as the motor drive is initially energized.

7. The method of claim 6, wherein said step of causing the motor current to be forced to zero includes the step of initially tracking a position of the rotor.

8. The method of claim 1, further comprising, prior to said step of determining the direction of rotation of the rotor, the step of causing an output voltage of an inverter of the motor drive to match a back EMF of the motor as the motor drive is initially energized.

9. The method of claim 1, wherein said step of causing the short-circuiting of the motor phase windings includes the step of causing a zero voltage vector to be applied to an inverter of the motor drive.

10. The method of claim 1, wherein said step of causing the open-loop forward rotating current vector to be applied to the motor causes the rotor to stop prior to causing the rotor to spin in the forward direction.

11. The method of claim 1, wherein said step of causing the open-loop forward rotating current vector to be applied to the motor includes the step of causing the forward rotating current vector to initially have a position that is substantially aligned with or behind a position of the rotor.

12. The method of claim 1, wherein said step of causing the open-loop forward rotating current vector to be applied to the motor includes the step of initially positioning the forward rotating current vector based on the determined rotor angle.

13. The method of claim 1, wherein said angle determining step includes the steps of: the determining the phasing of the short-circuit motor current vector while causing the short circuiting of the motor phase windings; and adding a phase angle shift to the phasing of the short circuit motor current vector to obtain the rotor magnet angle.

14. The method of claim 13, wherein the phase angle shift is a preset constant.

15. The method of claim 13, wherein the phase angle shift is determined from a table of values indexed by a speed of the rotor.

16. The method of claim 1, wherein the motor is a permanent magnet synchronous motor.

17. A catch start sequencer for controlling a motor drive for starting a sensorless motor having a rotor, the motor drive including an inverter for driving the motor, a pulse width modulation module for controlling the inverter, a vector rotator module for controlling the pulse width modulation module, a current regulator configured as a feedback loop between the inverter and the vector rotator module, and a rotor flux estimation module for estimating rotor flux, said catch start sequencer comprising: one or more interfaces for interfacing with the current regulator and the rotor flux estimation module, and wherein said catch start sequencer is configured: to determine whether the rotor is rotating in a forward or reverse direction; to cause a short circuiting of phase windings of the motor if the rotor is spinning in the reverse direction in order to slow down the reverse rotation of the rotor; to remove the short circuiting of the motor phase windings and to determine an angle of a rotor magnet by determining a phasing of a short circuit motor current vector, and to cause an open-loop forward rotating current vector to be applied to the motor in order to cause the rotor to spin in the forward direction to an initial speed; and to thereafter cause a closed-loop forward rotating current vector to be applied to the motor in order to cause the rotor to speed up to a set speed.

18. The catch start sequencer of claim 17, being further configured to cause the rotor to speed up to the set speed if said catch start sequencer determines the rotor is rotating in the forward direction.

19. The catch start sequencer of claim 17, wherein prior to determining the direction of rotation of the rotor, said catch start sequencer is configured to estimate a speed of rotation of the rotor based on an amplitude of rotor flux as provided by the rotor flux estimation module.

20. The catch start sequencer of claim 19, wherein if said catch start sequencer estimates a slow rotor speed, said catch start sequencer is configured: to cause the rotor to spin in the forward direction to the initial speed; and to thereafter cause the rotor to speed up to the set speed; and wherein if said catch start sequencer estimates a fast rotor speed, said catch start sequencer is configured to determine the direction of rotation of the rotor.

21. The catch start sequencer of claim 17, wherein prior to determining the direction of rotation of the rotor, said catch start sequencer is configured to cause an output voltage of the inverter to substantially match a back EMF of the motor as the motor drive is initially energized.

22. The catch start sequencer of claim 17, wherein upon causing the open-loop forward rotating current vector to be applied to the motor, said catch start sequencer is further configured to cause the forward rotating current vector to initially have a position that is substantially aligned with or behind a position of the rotor.

23. The catch start sequencer of claim 17, wherein said catch start sequencer is configured: to determine an initial phase angle of the forward rotating current vector based on the determined rotor magnet angle.

24. The catch start sequencer of claim 17, wherein to determine the rotor magnet angle, said catch start sequencer is further configured: to determine the phasing of the short circuit motor current vector while causing the short circuiting of the motor phase windings; and to add a phase angle shift to the phasing of the short circuit motor current vector to obtain the rotor magnet angle.

25. The catch start sequencer of claim 24, wherein the phase angle shift is a preset constant.

* * * * *

UNITED STATES PATENT AND TRADEMARK OFFICE
CERTIFICATE OF CORRECTION

| | | |
|---|---|---|
| PATENT NO. | : 7,652,441 B2 | Page 1 of 1 |
| APPLICATION NO. | : 11/477185 | |
| DATED | : January 26, 2010 | |
| INVENTOR(S) | : Eddy Ying Yin Ho | |

It is certified that error appears in the above-identified patent and that said Letters Patent is hereby corrected as shown below:

On the cover of the patent, left column, line 2, "Ying Yin Ho" should be changed to --Ho--.

Signed and Sealed this
Twenty-second Day of November, 2011

David J. Kappos
*Director of the United States Patent and Trademark Office*